(12) United States Patent
Usui et al.

(10) Patent No.: US 6,648,459 B2
(45) Date of Patent: *Nov. 18, 2003

(54) VALVE UNIT IN INK SUPPLY CHANNEL OF INK-JET RECORDING APPARATUS, INK CARTRIDGE USING THE VALVE UNIT, INK SUPPLY NEEDLE AND METHOD OF PRODUCING THE VALVE UNIT

(75) Inventors: Minoru Usui, Nagano (JP); Takao Kobayashi, Nagano (JP); Satoshi Shinada, Nagano (JP); Hisashi Miyazawa, Nagano (JP); Takahiro Naka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,355

(22) Filed: Aug. 7, 2001

(65) Prior Publication Data

US 2002/0063758 A1 May 30, 2002

Related U.S. Application Data

(62) Division of application No. 09/040,238, filed on Mar. 16, 1998, now Pat. No. 6,302,531.

(30) Foreign Application Priority Data

Mar. 19, 1997 (JP) ................................. 9-85988
Dec. 18, 1997 (JP) ............................... 9-364611

(51) Int. Cl.[7] ............................................. B41J 2/175
(52) U.S. Cl. ....................................................... 347/86
(58) Field of Search ............................... 347/86, 85, 87, 347/93, 94; 137/859; 251/354

(56) References Cited

U.S. PATENT DOCUMENTS 3,779,274 A    12/1973  Kelly ........................ 137/505

(List continued on next page.)

FOREIGN PATENT DOCUMENTS

| DE | 1 152 583 | 9/1958 |
| DE | 195 45 775 A1 | 6/1997 |
| EP | 0 116 466 | * 8/1884 |
| EP | 0 112 701 | 7/1984 |
| EP | 0 238 829 A2 | 9/1987 |
| EP | 0 336 307 | 10/1989 |
| EP | 0 709 207 A2 | 5/1996 |
| FR | 1 268 227 | 9/1960 |
| FR | 2 391 405 | 12/1978 |
| JP | 55-146766 | 11/1980 |
| JP | 355146766 A | * 11/1980 ............. 347/86 |

Primary Examiner—Shih-Wen Hsieh
(74) Attorney, Agent, or Firm—Stroock & Stroock & Lavan LLP

(57) ABSTRACT

A valve unit in an ink supply channel of an ink-jet recording apparatus, the ink supply channel having an upstream side and a downstream side, the valve unit comprising a diaphragm valve having a thin elastic diaphragm operating in response to pressure difference between an upstream side and a downstream side of the diaphragm, a valve body formed on the surface of the thin elastic diaphragm and having an opening therein, and an elastic support portion integrally formed with the valve body for urging the valve body toward the upstream direction, a valve seat disposed in the ink supply channel upstream of the diaphragm and kept in elastic contact with the opening, and a flow-channel forming plate for forming a flow channel disposed on the downstream side of the valve seat, the flow channel, extending in a longitudinal direction of the elastic portion and the flow channel forming plate having an end portion side extending in an upstream direction to form a flow channel whose sectional area decreases in the longitudinal direction.

12 Claims, 12 Drawing Sheets

U.S. PATENT DOCUMENTS

| | | | |
|---|---|---|---|
| 4,514,742 A | 4/1985 | Suga et al. | 347/85 |
| 4,628,576 A | 12/1986 | Giachino et al. | 29/890.128 |
| 4,677,447 A | 6/1987 | Nielson | 347/87 |
| 4,869,282 A | 9/1989 | Sittler et al. | 137/15 |
| 5,477,963 A | 12/1995 | Mochizuki et al. | 206/701 |
| 5,691,753 A | 11/1997 | Hilton | 347/85 |
| 5,815,185 A | 9/1998 | Pietrzyk | 347/92 |
| 6,000,788 A * | 12/1999 | Iida | 347/86 |
| 6,010,211 A | 1/2000 | Betschon | 347/86 |
| 6,302,531 B1 * | 10/2001 | Usui et al. | 347/86 |

* cited by examiner

VALVE UNIT IN INK SUPPLY CHANNEL OF INK-JET RECORDING APPARATUS, INK CARTRIDGE USING THE VALVE UNIT, INK SUPPLY NEEDLE AND METHOD OF PRODUCING THE VALVE UNIT

CROSS REFERENCE TO RELATED APPLICATION

This is a division U.S. Ser. No. 09/040,238, filed Mar. 16, 1998, now U.S. Pat. No. 6,302,531, now allowed.

BACKGROUND OF THE INVENTION

The present invention relates generally to a valve unit, and in particular, a valve unit disposed in an ink supply channel for use in connecting an ink-jet recording head and an ink tank, and which is capable of generating a negative pressure.

Conventional inkjet printers generally include a carriage which is loaded with an inkjet recording head and an ink cartridge for supplying ink. With the carriage in place, the carriage reciprocately moves along a recording paper and discharges ink drops onto recording paper according to printing data. The recording head discharges the ink drops from nozzle holes by generating a pressure within a pressure generating chamber. The pressure generating chamber communicates with a common ink chamber and the nozzle holes of the recording head.

With such a recording head, since the nozzle hole is normally positioned lower than the ink liquid level in the ink cartridge, the head pressure acts on the nozzle hole and causes the ink to leak out of the nozzle hole. In order to solve this problem, a porous material is usually placed in the ink cartridge, so that the capillary force from the porous material keeps the ink pressure in the ink cartridge slightly lower than the pressure in the recording head.

When the quantity of the ink absorbed into the porous material decreases as ink use increases the capillary force of the porous material delays the supply of ink into the recording head. As a result, the ink in the carriage is not completely used. Another problem associated with the ink carriage is the large size of the ink cartridge required to house the large volume of the porous material.

Generally an ink cartridge is constructed such that a wall having an opening is provided in the lower portion of an ink tank thus dividing the lower portion thereof into an ink reservoir and a cavity. A check valve is installed in the opening of the wall, such that when ink pressure in the recording head is lowered the valve opens, discharges the ink from the reservoir into the cavity and supplies the ink to the recording head.

Accordingly, it is desirable to provide an ink cartridge for an ink-jet recording head, which overcomes the inadequacies of the prior art.

SUMMARY OF THE INVENTION

Generally speaking, in accordance with the invention an ink cartridge for an ink-jet recording head is constructed such that, a diaphragm valve comprising an elastic diaphragm having an opening, is used for separating an ink inflow side from an ink outflow side. The ink pressure in the ink-jet recording head is kept slightly negative between the ink inflow side and the ink outflow side. In addition, the amount of ink supply is proportional to the ink used in the recording head. A preferred embodiment is a valve unit that ensures that any bubbles formed in the proximity of the diaphragm valve are removed, while a negative pressure is kept in the recording head in response to minute pressure differences.

In accordance with the invention, a valve unit in an ink supply channel of an ink-jet recording apparatus includes a diaphragm valve having a thin elastic diaphragm, a valve body which is formed on surface downstream of the thin elastic diaphragm, the valve body having an opening and an elastic support portion which is attached to the valve body. The elastic thin diaphragm operates in response to pressure difference between an upstream side and a downstream side. A valve seat is positioned on the upstream side of the ink supply channel and kept in contact with the opening in the valve body. A flow-channel having a smaller sectional area is formed by: (1) a plate which is disposed on the downstream side of the valve seat, (2) the extended direction of the elastic support portion which forms the longitudinal side, and (3) the end portion side of the elastic support which forms the upward side.

The diaphragm valve has a wide area and it responds to the differences in pressure by opening the flow channel in proportion to the amount of ink used in the recording head in order to supply ink. The flow channel forming plate forms the lower region of the diaphragm valve with its lower region. Since the upward side of the plate is narrower, bubbles tend to concentrate in this section. When ink is discharged by exerting negative pressure on the recording head, the flow rate of ink in this section is prevented from unnecessarily lowering. Therefore, bubbles are carried along with the ink to the outside Accordingly, it is an object of the invention to provide an improved valve unit for an inkjet recording apparatus.

Another object of the invention is to provide a valve unit that ensures that any bubbles formed in the proximity of the diaphragm valve are removed while a negative pressure is kept in the recording head.

A further object of the invention is to provide an improved ink cartridge which incorporates the improved valve unit and further includes an ink supply needle.

Another object of the invention is to provide an improved method for producing the valve unit.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
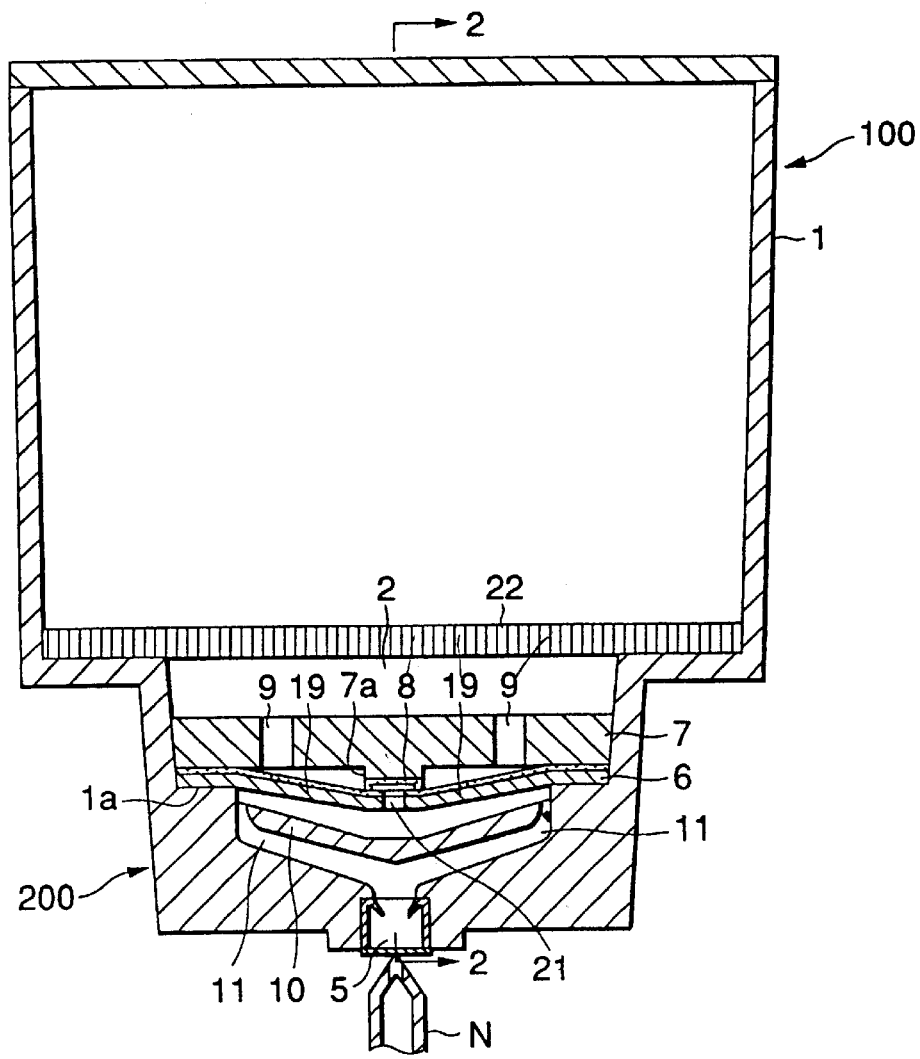
FIG. 1 is a sectional view of a valve unit, constructed in accordance with the invention, in the closed position.
Figure 2:
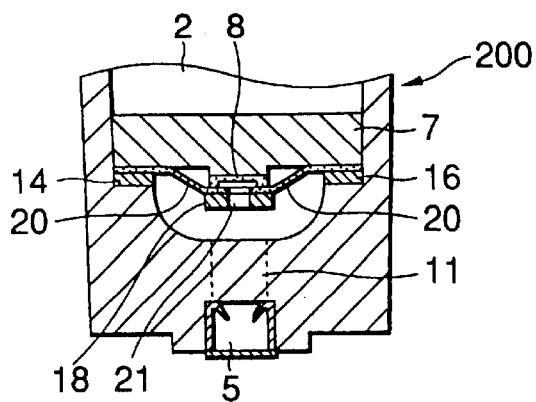
FIG. 2 is a sectional view taken along line 2—2 of FIG. 1.

Reference is first made to FIG. 1, an ink cartridge, generally indicated as 100, which generally incorporates a valve unit generally indicated as 200 constructed in accordance with the present invention. Ink cartridge 100 includes a container 1. An ink chamber 2 is formed in the upper portion of container 1, and an ink supply port 5 in its lower portion. Ink supply port 5 receives a needle N.

A substantially rectangular concave portion is formed within container 1. A diaphragm valve 6 for separating the ink chamber 2 from the ink supply port 5 is accommodated within the concave portion. The periphery of the underside of the diaphragm valve 6 is supported by a different-in-level portion 1a of container 1. The diaphragm valve 6 is disposed in container 1 by aligning its ink chamber (upstream) side with a valve-seat forming member 7 disposed within container 1.

Figure 3:
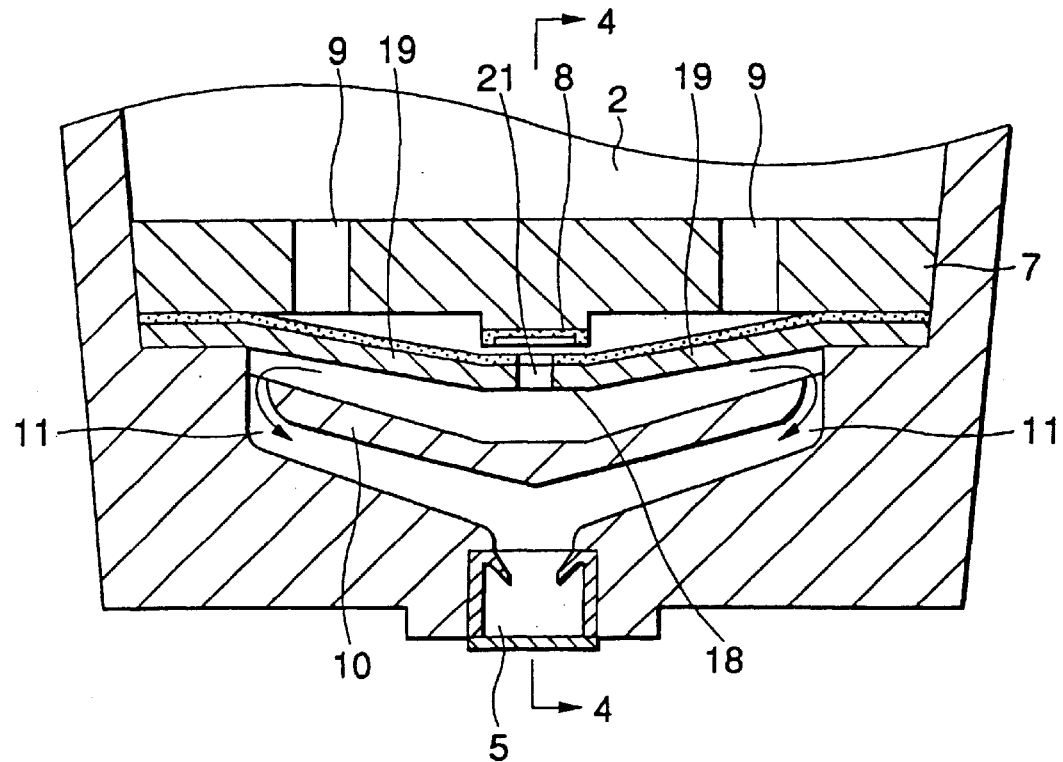
FIG. 3 is a sectional view of the valve unit, constructed in accordance with the invention, in the open position.

The valve-seat forming member 7 has, in its center, a protrusion 7a projecting toward the downstream side. A valve seat 8 made of elastic member such as rubber is fixed to the front end of the protrusion 7a. Further, at least one opening 9, preferably a plurality of them, communicating with the ink chamber 2 is bored about the periphery of the valve seat 8. FIGS. 1 and 3.

An ink-flow regulating plate 10 is integrally formed with container 1 and disposed within the concave portion of container 1 and downstream of the diaphragm valve 6. In a preferred embodiment, ink flow regulating plate 10 slopes towards ink port 5, openings 11 are formed at the highest position of ink-flow regulating plate 10 which communicate with the ink supply port 5. FIG. 3.

Figure 5:
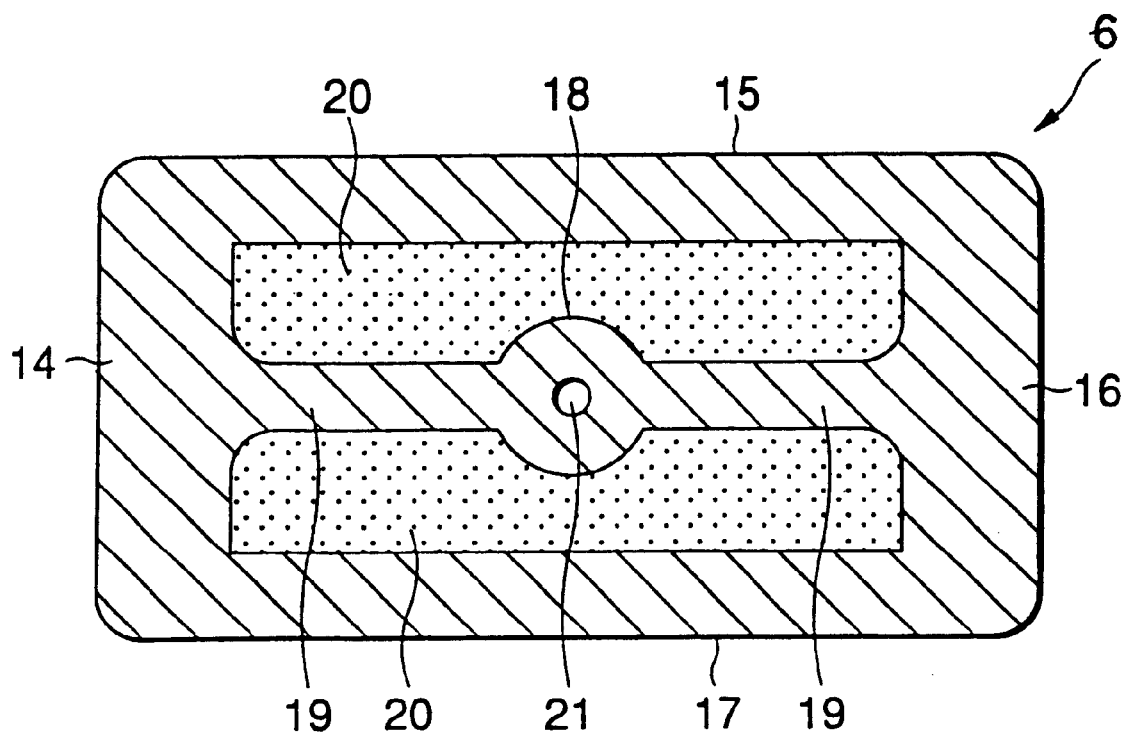
FIG. 5 is a top plan view of a diaphragm valve constructed in accordance with the invention.
Figure 6:
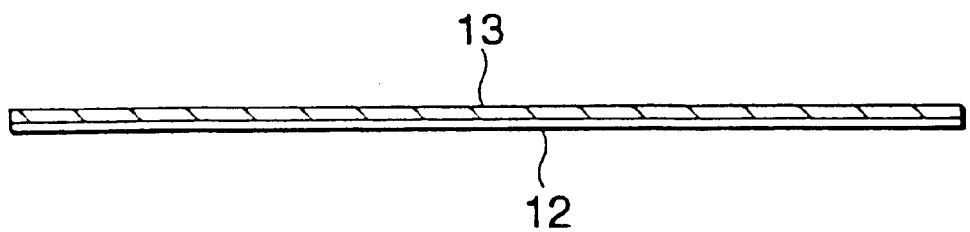
FIG. 6 is a sectional view of a plate material used in construction of the diaphragm valve.

The diaphragm valve 6 shown in FIGS. 5 and 6 is formed by cutting a lamination material comprising a soft macromolecular film 12 and a metal plate 13 into a rectangle, etching the metal plate 13 to form four sides 14, 15, 16, 17. These four sides are supported within container 1; a central portion is formed as a valve body 18, and elastic support portions 19, 19 are formed adjacent thereto. The elastic support portions 19, 19 support the valve body 18 from both sides and extend to frame opening portions 20, 20. Portions 20, 20 are windows which expose a macromolecular film 12. The valve body 18 includes an opening 21.

The width of the elastic support portions 19, 19 is selected to allow elastic deformation in response to differences in pressure relative to that of the pressure in the recording head.

The diaphragm valve 6 is secured by the valve-seat forming member 7 from the ink chamber side to container 1 and adjusted by the different-in-level portion 1a of container 1. A filter 22 for removing bubbles and dust contained in ink is disposed in the upper portion of the ink chamber.

According to one embodiment of the present invention, ink carriage 100 is loaded on to the recording apparatus by fitting the ink supply needle N into the ink supply port 5 of the ink carriage.

Figure 4:
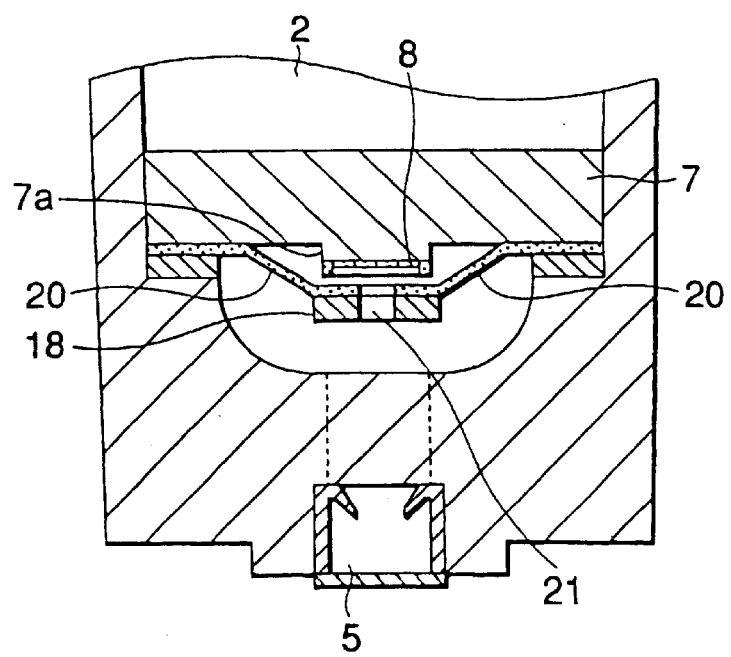
FIG. 4 is a sectional view taken along line 4—4 of FIG. 3.

In order to avoid air being introduced into the ink, the pressure in the ink supply port 5 is lowered when ink in the ink carriage is drawn into the recording head by letting the negative pressure act on the recording head via a cap member. The difference in pressure is then detected by diaphragm valve 6. As shown in FIGS. 3 and 4 the diaphragm valve 6 is separated from the valve seat 8, and the ink in the ink chamber 2 passes between the opening 11 in the highest position, and the now lower portion (opening 21) of the diaphragm valve 6 and made to flow into the ink supply port 5.

Because of the positioning of the flow channel in the lower region of the diaphragm valve 6, any bubbles concentrated in the lower portion of the diaphragm valve 6 are concentrated in the proximity of the opening 11 due to their own buoyancy. As the flow rate of the ink in this region is higher than that in other regions, the bubbles are carried by the flow of the ink before being discharged via the recording head into the cap member.

At the stage where the filling-up of ink is completed and when a printing operation is performed, the ink in the lower region of the diaphragm valve 6 flows into the recording head via the ink supply port 5. The pressure in the lower region of the diaphragm valve 6 lowers gradually. When the negative pressure exceeds the restorative force of supporting elastic support portions 19, the diaphragm valve 6 bends downstream toward the side of the ink supply port 5. This causes the opening 21 to separate from the valve seat 8. Thus, the ink in the ink chamber 2 is passed through the opening 21 and flows into the ink supply port 5 until the pressure in the ink supply port 5 becomes excessively negative.

When the pressure in the lower region of the diaphragm valve 6 rises slightly owing to the inflow of the ink, the elastic support portions 19 overcome the ink pressure from ink chamber 2 and guide the valve body 18 toward the upstream side. This ensures that the valve body 18 is brought into elastic contact with the valve seat 8 so as to close the opening 21. Consequently, the pressure in the ink supply port 5 is kept negative for maintaining the meniscus of the recording head, irrespective of the level of the liquid level of ink in ink chamber 2.

To prevent discharge of ink drops from a nozzle hole that may result after a long period of printing, the nozzle plate of the recording head is sealed by a cap. This cap activates the negative pressure, whereby the bubbles concentrated in the proximity of the opening 11 are discharged outside the recording head.

Figure 7:
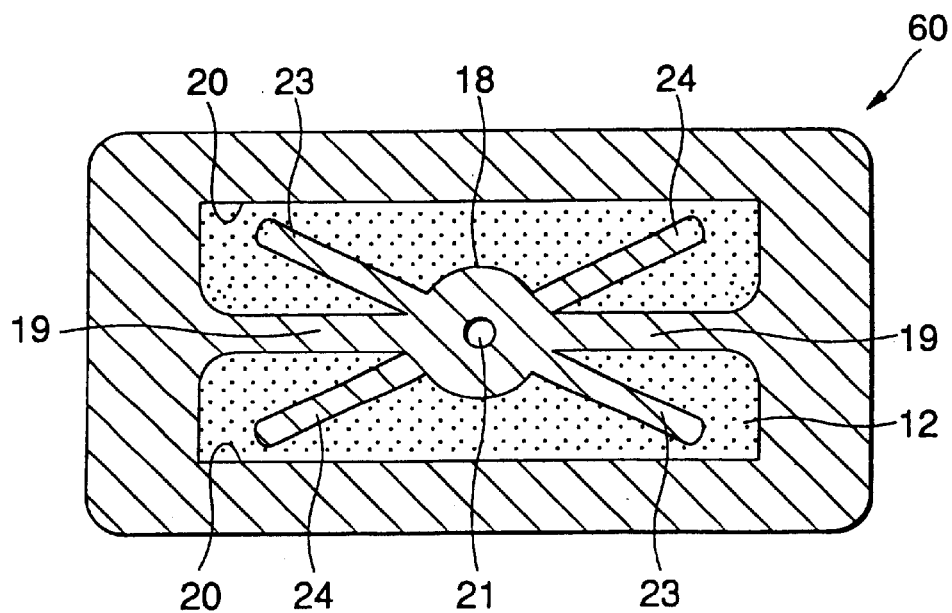
FIG. 7 is a top plan view of a diaphragm valve for use in the ink cartridge according to a second embodiment of the present invention.
Figure 8:
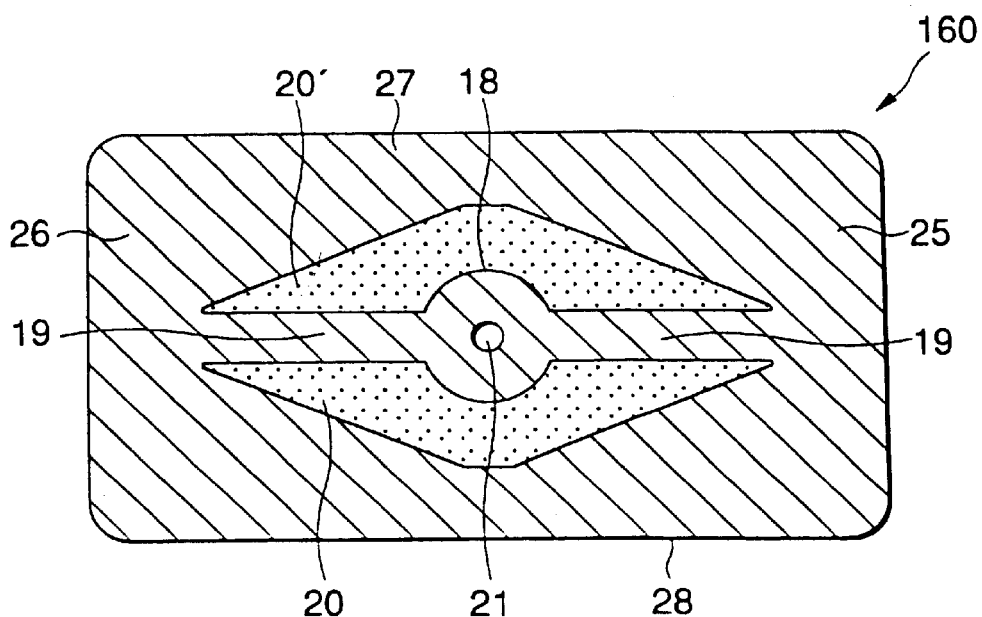
FIG. 8 is a top plan view of a diaphragm valve for use in the ink cartridge according to still another embodiment of the present invention.
Figure 9:
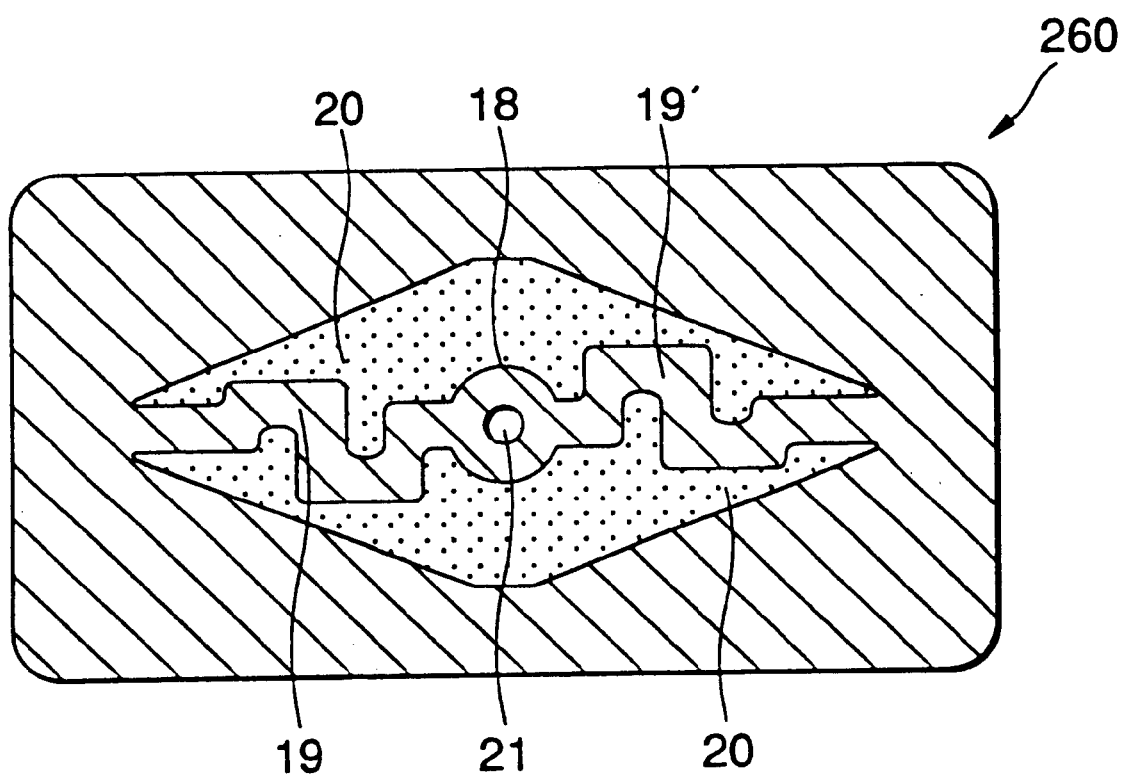
FIG. 9 is a top plan view of a diaphragm valve for use in the ink cartridge according to still yet another embodiment of the present invention.

FIGS. 7–9 show other diaphragm valves 6 embodying the present invention. In each embodiment like parts are indicated with like numerals, only the differences being described. FIG. 7 depicts a valve 60 having branch portions 23, 23 disposed symmetrically about the opening 21 of the valve body 18. Branch portions 23 are formed by etching of the metal plate 13 and extend across portions of film 12 to ensure that the differential pressure is transferred to the valve body 18 and the elastic support portions 19. The macromolecular film 12 is in turn prevented from deforming excessively.

FIG. 8 shows a preferred embodiment of a diaphragm valve 160 wherein the flow channel in the lower region of the diaphragm valve 6 is throttled by the ink-flow regulating plate 10. This results in a narrower flow channel toward the end portion in the direction in which the elastic support portions 19 are extended. In this case, a diamond window 20' is formed by etching the metal plate 13 in such a way as to leave the valve body 18 in the central portion, the elastic support portions 19 for supporting the valve body 18 at both sides, and fitting frame portions 25, 26, 27, 28 on the periphery of the window.

According to another embodiment of the present invention, the valve body 18 is made more sensitive to differences in pressure by weakening the rigidity of the macromolecular film 12 in the central region where the valve body 18 is situated. Moreover, the flow channel can be made narrower in the fixed region of each elastic support portion 19 where bubbles tend to become stationary. The bubbles are then removed by means of the inflow of ink from openings 9.

FIG. 9 depicts an embodiment in which a diaphragm valve 260 includes a valve body 18 which is supported with elastic support portions 19', 19' in the form of a zigzag in place of the elastic support portions 19, 19. According to this embodiment of the present invention, the flexible deformation region of the elastic support portions 19' 19' is made expandable. Therefore, the valve body 18 can be moved in response to even minute differences in pressure.

Figure 10:
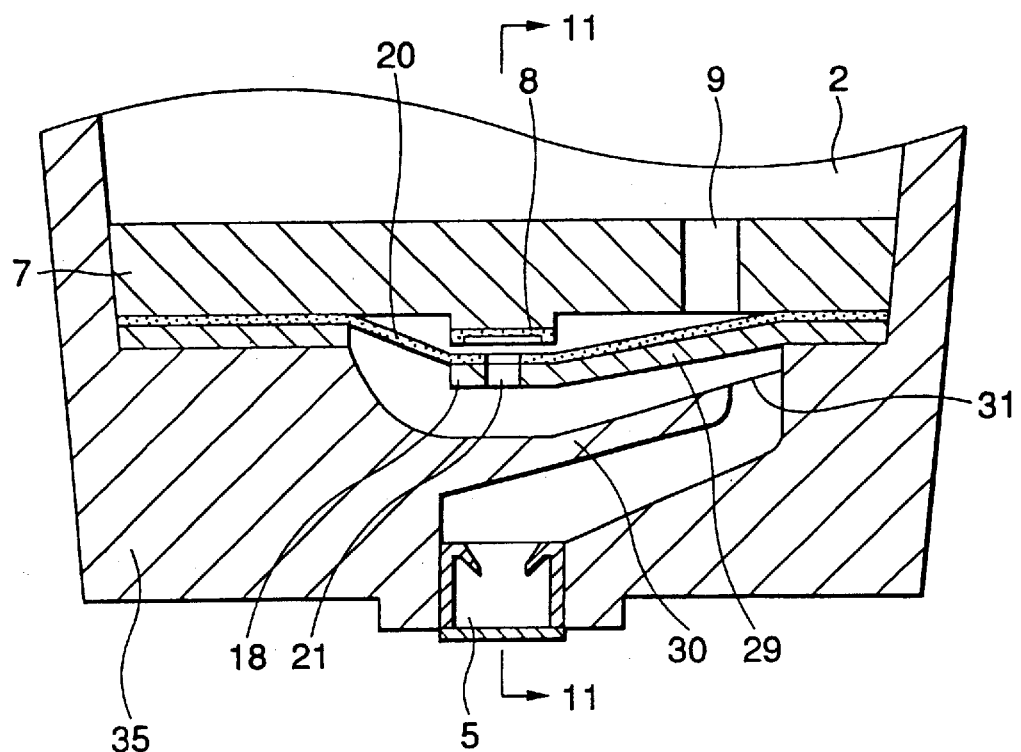
FIG. 10 is a sectional view of a valve unit, constructed in accordance with yet another embodiment of the invention, in the open position.
Figure 11:
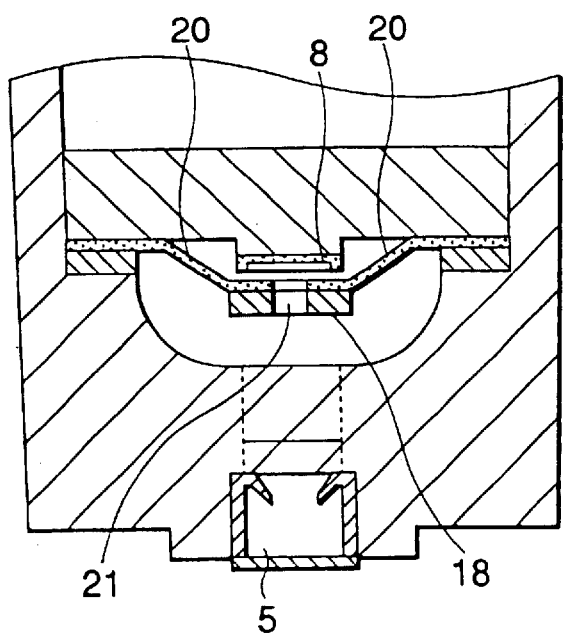
FIG. 11 is a sectional view taken along line 11—11 of FIG. 10.
Figure 12:
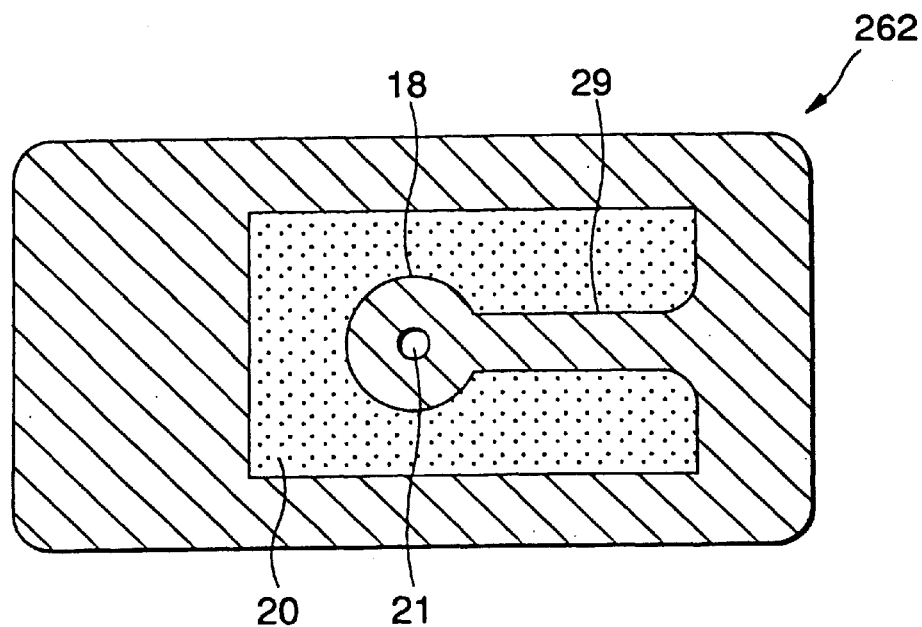
FIG. 12 is a top plan view of a diaphragm valve of the valve unit according to another embodiment of the present invention.

Reference is now made to FIGS. 9–11 which show another embodiment of the present invention. The diaphragm valve 260 is arranged so that only one portion of the downstream side of valve body 262 is supported by an elastic support portion 29. This results in a cantilevered support as shown in FIG. 11. A flow-channel forming substrate 30 extending from a container wall 35 is curved upward along the direction in which the cantilever elastic support portion 29 is extended and regulates a flow channel formed between diaphragm valve 262 and substrate 30 in such a way as to narrow the width of the flow channel. In this case, ink is made to flow into the ink supply port 5 from one opening 31 formed in the highest position of the flow-channel forming substrate 30.

According to yet another embodiment of the present invention, the ink flow channel region in the proximity of the diaphragm valve is narrowed further to allow bubbles in the diaphragm valve to concentrate in one place before being carried by the flow of ink outside.

Figure 13:
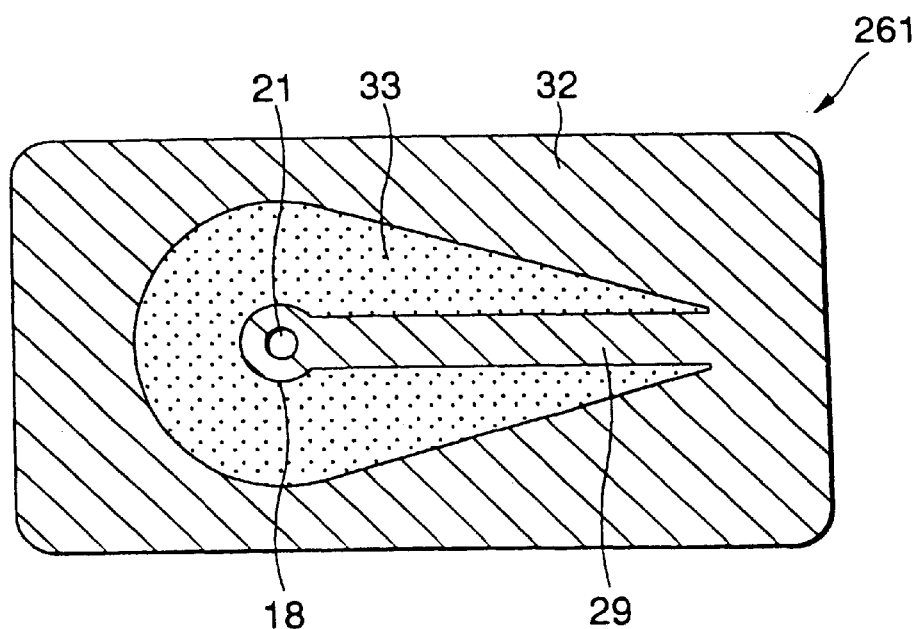
FIG. 13 is a top plan view of another embodiment of a diaphragm valve of the valve unit according to the present invention.

FIG. 13 shows a diaphragm valve 261 embodying the present invention which is suitable for use in the above valve unit. In this embodiment a frame portion 32 includes a window which narrows as it extends in one direction along support portion 29 and away from valve body 18 and opening 21.

Figure 14:
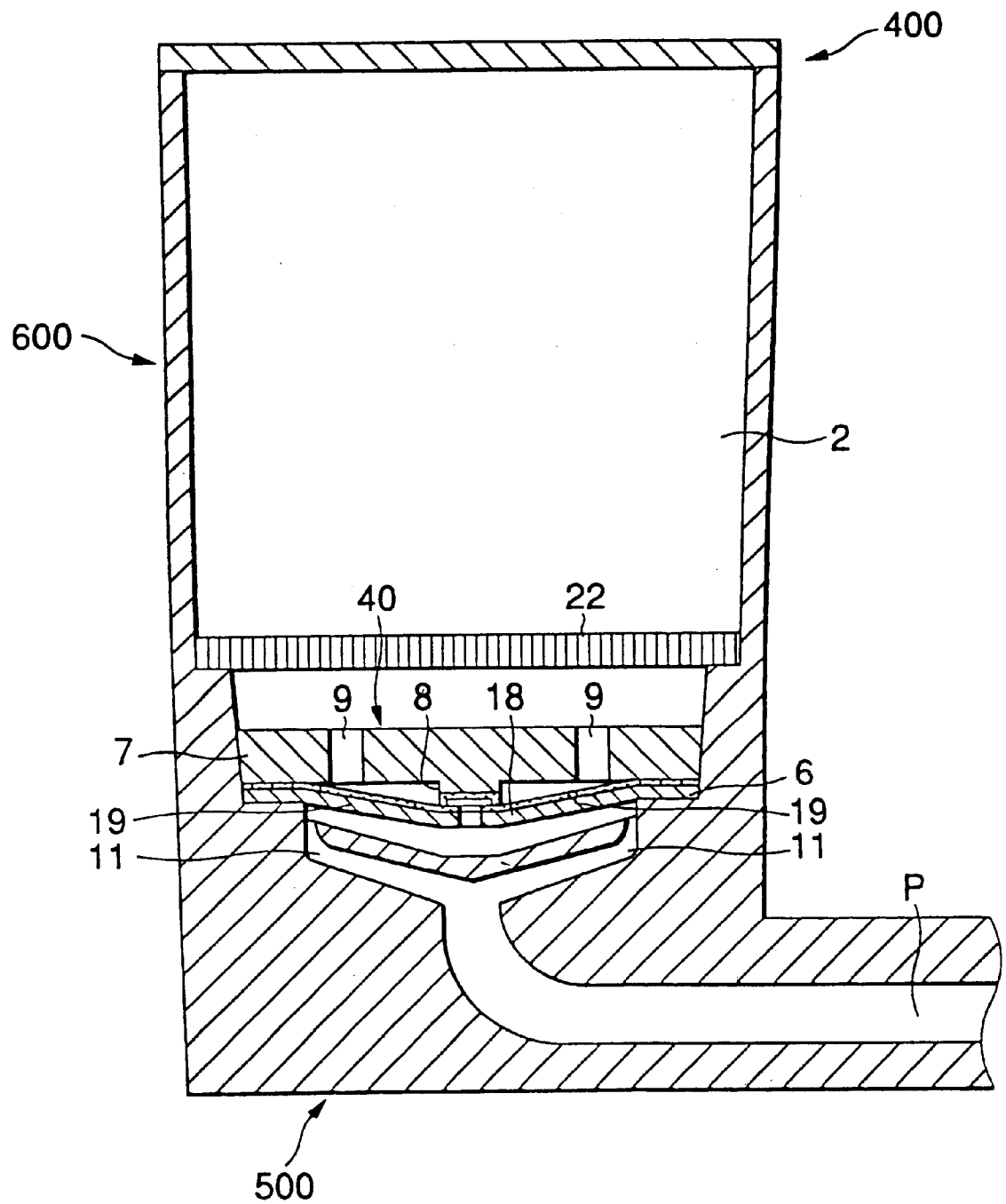
FIG. 14 is a sectional view of a recording head constructed in accordance with the invention, employing the valve unit incorporated in an ink tank.

Although a description has been given of the case where the valve unit is incorporated in the ink carriage in the aforesaid embodiment of the present invention, a disposable type recording head 400, as shown in FIG. 14, incorporating a recording head 500 and an ink tank 600 can also be used to achieve the same effect. Like numerals are utilized to indicate like structures for the previous embodiments. In this embodiment, recording head 400 includes an ink tank 600 having an ink chamber 2 therein. A filter 22 separates ink chamber 2 from valve unit 40. Recording head 500 includes an ink supply channel P. Valve unit 40 is disposed between chamber 2 and ink supply channel P. Valve unit 40 includes an elastic diaphragm valve 6 disposed within container 1 and fixed in place by a valve seat forming member 7. Valve seat forming member 7 has openings 9 bored therein around the periphery of valve seat 8. Valve 6 is provided an opening 18 which selectively comes in contact with valve seat 8 in response to pressure changes between ink supply channel P and ink chamber 2.

An ink flow regulating plate 10 is disposed between ink supply channel P and valve 6 to form openings 11 to provide a fluid path between ink chamber 2 and ink supply channel P.

In addition to being supported from both sides in ink supply units 170, 270, the valve 6 may be supported in the cantilever fashion as shown in FIG. 10, by shortening the elastic support portion.

The lamination material of a soft macromolecular film and a metal plate is processed by etching in the aforesaid embodiments of the present invention. The same effect can be achieved by subjecting a valve body, elastic support portions and a frame portion to metal plate pressing, or bonding a macromolecular plate formed by injection molding to a macromolecular film.

In the case of printing data with a relatively low dot density, the elasticity of the whole diaphragm valve has to be lower to allow valve deflection in the pressure of low differences in pressure. This in turn results in instability of the position of the valve body and reduction in ink supply.

Figure 15:
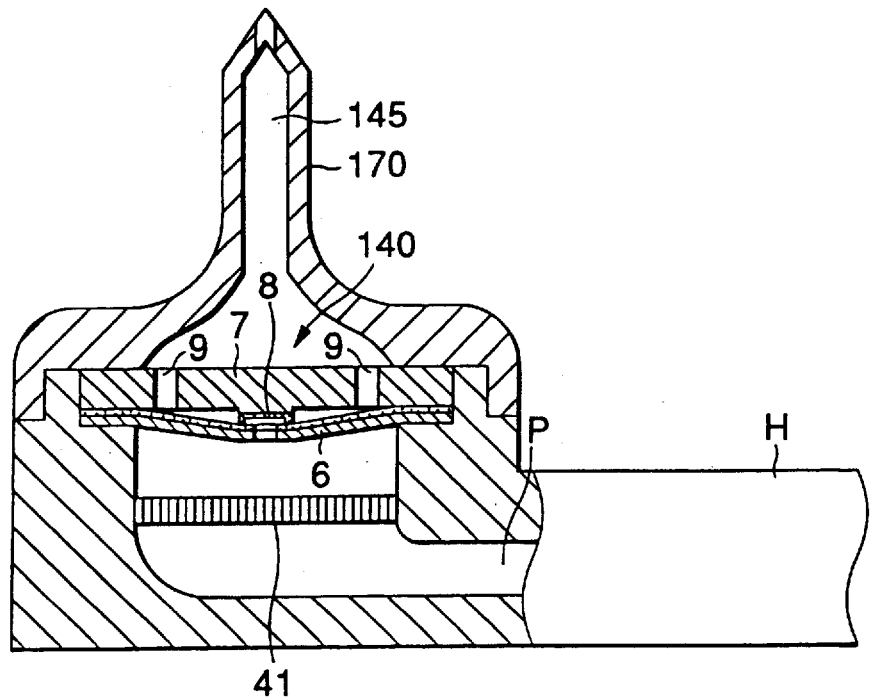
FIG. 15 is a sectional view of an ink supply needle constructed in accordance with the invention.

FIG. 15 is a sectional view depicting an ink supply needle constructed in accordance with another embodiment of the invention. The same reference number have been used to identify components previously discussed, and the arrangement of the depicted ink supply needle will be apparent in view of the earlier discussion of those components.

Figure 16:
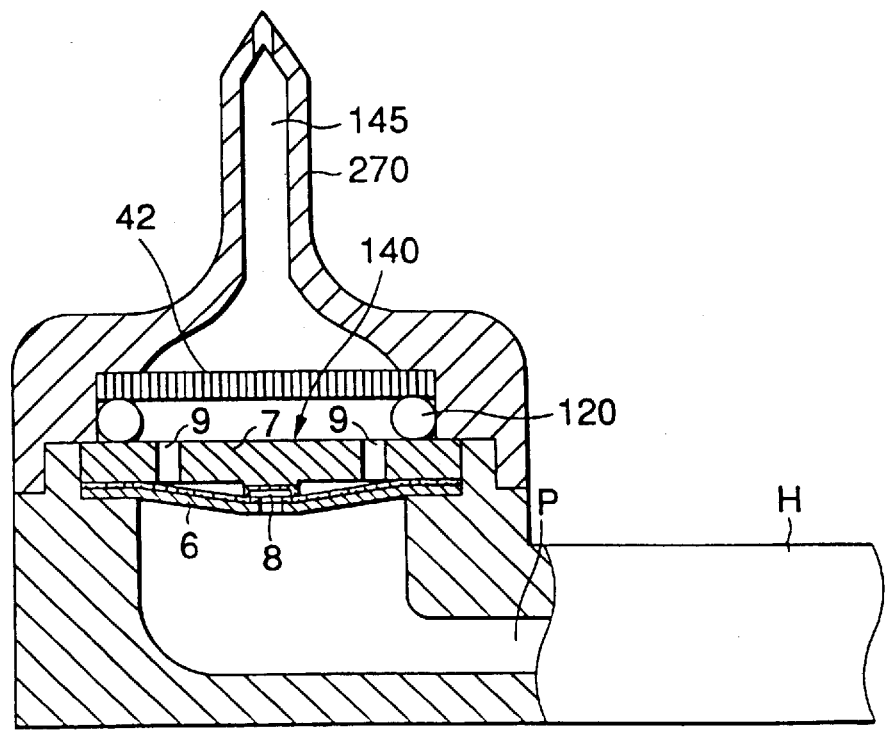
FIG. 16 is a sectional view of an ink supply needle constructed in accordance with another embodiment of the invention.

FIG. 16 is a sectional view showing an ink supply needle constructed in accordance with another embodiment of the invention. The same reference number have been used to identify components previously discussed, and the arrangement of the depicted ink supply needle will be apparent in view of the earlier discussion of those components.

Figure 17:
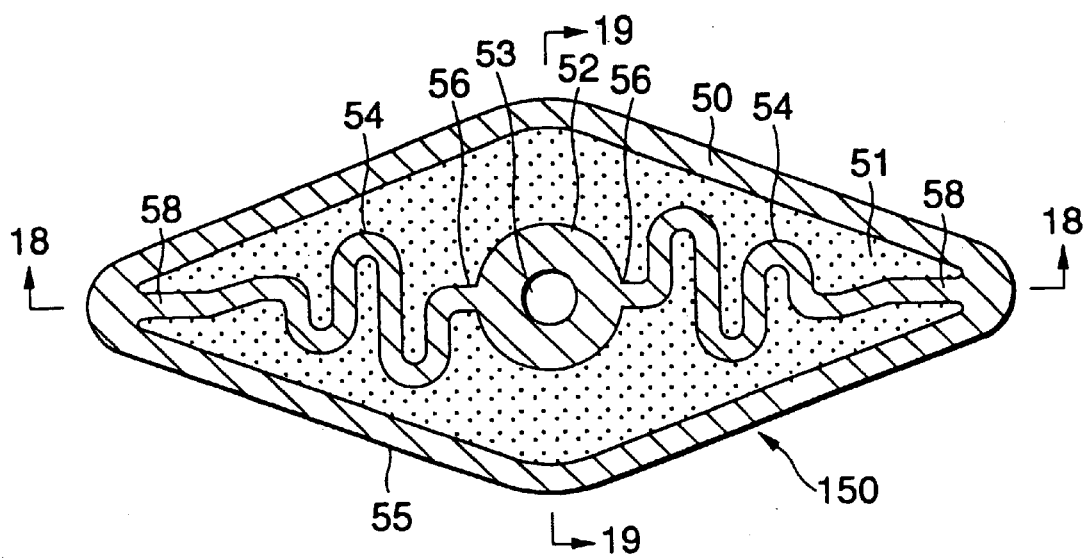
FIG. 17 is a top plan view showing a different embodiment of a diaphragm valve in accordance with the present invention.

Reference is now made to FIG. 17 in which a diaphragm valve 150 is embodying the present invention suitable for overcoming this problem. Diaphragm valve 150 is formed through the steps of etching or pressing a readily machinable elastic metal plate. For example, a stainless steel plate 50 having a thickness of about 0.03 mm, is formed to include a valve body 52 at the center point. The valve body 52 has an opening 53 situated in the center thereof. Zigzag branch portions 54, 54 have first 56 and second ends 58, the respective first ends 56 are continuous with the valve body 52 symmetrical with respect to the center point. The respective second ends 58 of the branch portions 54, 54 are connected to a peripheral portion 55 of metal plate 50.

Figure 18:
FIG. 18 is a plastic film of the diaphragm sectional view taken along 18—18 of FIG. 17;.
Figure 19:
FIG. 19 is a sectional view of the plastic film of the diaphragm taken along line 19—19 of FIG. 17.

The metal plate 50 is bonded, preferably via an adhesive layer, to an extendible macromolecular material capable of plastic deformation. For example, a polyphenylene sulfide (PPS) plastic film 51 having a thickness of 0.0035 mm, which has been subjected to plastic deformation in such a way that its central portion is projected to the extent that the valve body 52 is at least separated from the valve seat 8 as shown in FIGS. 18, 19. After or before the above combination is completed, a flow channel is formed by providing the plastic film 51 with an opening bored in a position corresponding to the opening 53 of the valve body 52.

Figure 20I:
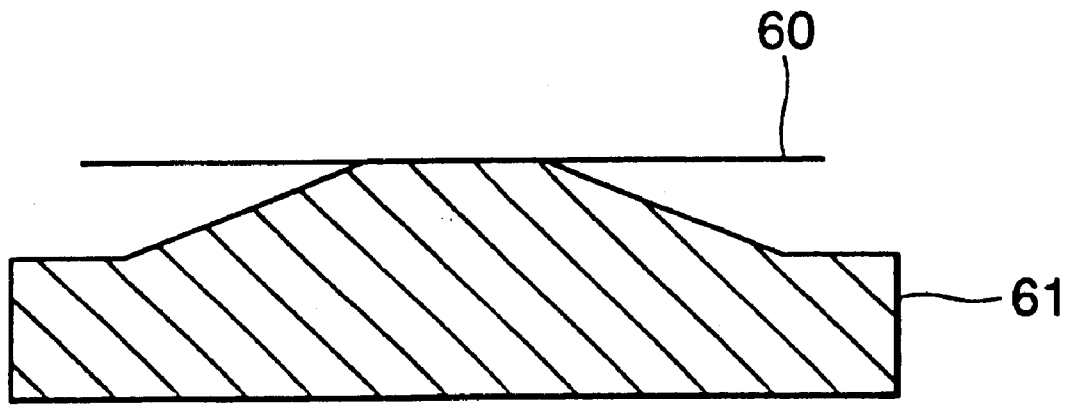
FIGS. 20(I) and (II) show the steps of processing plastic films according to the present invention.
Figure 20:
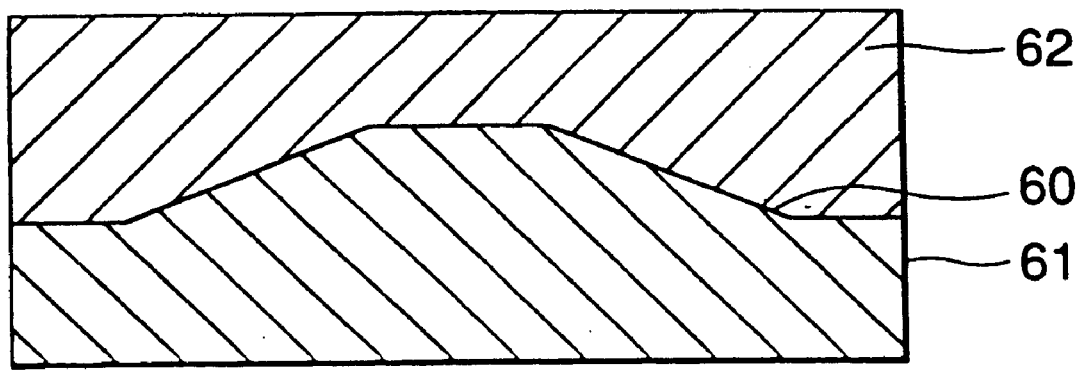

Reference is now made to FIGS. 20(I) and 20(II) in which a method for deforming a plastic material is provided. The plastic deformation to construct a plastic film in accordance with the invention is intended to provide a bulge. A plastic film 60 is preheated at temperatures higher than its thermal deformation or secondary transition temperature and lower than its softening point. The film is positioned on a convex material 61 having a desired swelling profile as shown in FIG. 13(I), and pressed by a corresponding concave material 62 as shown in FIG. 13(II). The plastic then cools with the desired bulge.

According to another embodiment of the present invention, since the plastic film 51 has a bulge equivalent to the open valve position, the force of bringing the valve body 52 into contact with the valve seat 8 substantially acts on the elasticity of the branch portions 54, 54. Thus, as the rigidity of the branch portions 54, 54 is increased the valve is opened with lower differences in pressure while the valve body 52 is prevented from staggering.

On condition that the joint region in particular is limited to where the plastic film 51 and the valve body 52 are joined, elastic force of the plastic film 51 acting on the valve body 52 can be suppressed and the follow-up capability of the valve body 52 can also be improved.

Figure 21A:
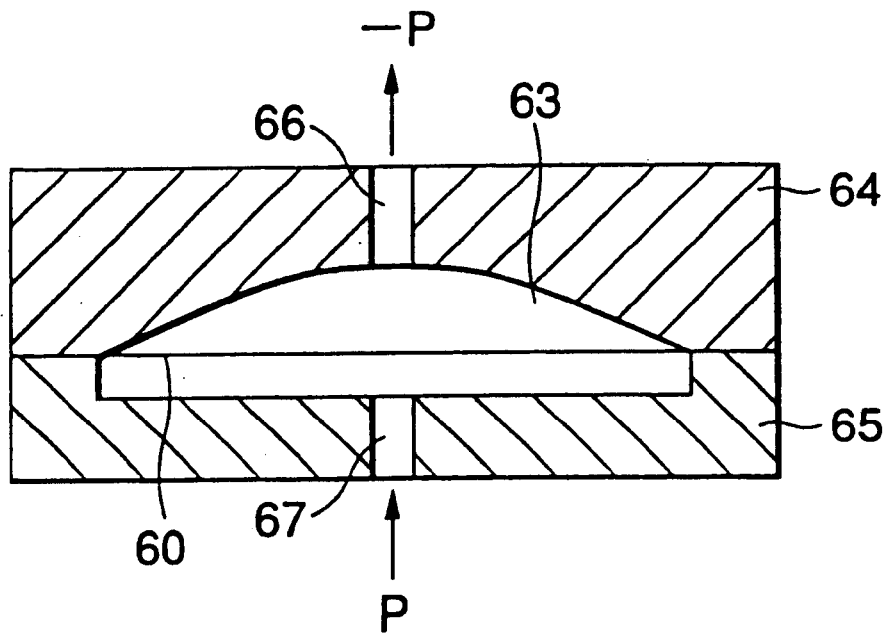
FIGS. 21(a) and (b) show steps of producing the diaphragm valves according to another embodiment of the present invention.

FIGS. 21(a) and (b) show other embodiments of the aforesaid plastic deformation according to the present invention. In the embodiment of the present invention shown in FIG. 21(a), a cap member 64 with a concave portion 63 necessary for plastic working and a base 65 are used to fix the peripheral edge of a plastic film 60 under airtight conditions. The film is heated at temperatures higher than its thermal deformation or secondary transition temperature and lower than its softening point. The differential pressure of openings 66, 67 causes the pressure on the side of the concave portion 63 to become higher. Plastic deformation is caused by letting negative pressure-P act on the concave portion 63. Positive pressure P is then applied from the base side.

Figure 21B:
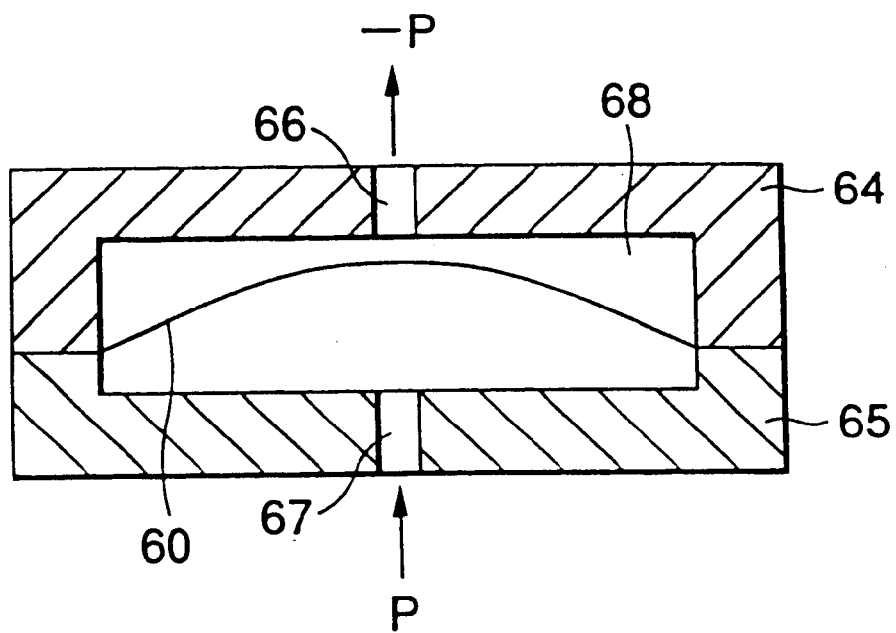

Although the concave portion 63 corresponding to the profile for causing the plastic deformation to the cap member 64 is formed in the aforesaid embodiment of the present invention, such plastic deformation may be caused likewise by simply forming a cavity 68 as shown in FIG. 21(b) and creating the difference in pressure for the plastic film 60.

In other embodiments of the invention plastic deformation to the macromolecular films may be carried out in valves 6, 60, 160, 260, 261 and 262.

As set forth above, according to the present invention, the valve unit is provided with the diaphragm valve having the thin elastic diaphragm operating in response to pressure difference between the upstream side and the downstream side. The valve body is formed on the surface of the thin elastic diaphragm and has an opening therein. The elastic support portion is integrally formed with the valve body and used for moving the valve body toward the upstream side.

The valve seat is positioned on the upstream side of the ink supply channel and kept in elastic contact with the opening. The flow-channel forming plate for forming the flow channel is disposed on the downstream side of the valve seat, with the extended direction of the elastic support portion as the longitudinal side and with its end portion side as the upward side, in order to form the flow channel whose sectional area becomes smaller. The diaphragm valve receives the differential pressure with its wide area and opens the flow channel in proportion to the use of ink in the recording head in order to supply ink. Since the flow channel forming plate forms the lower region of the diaphragm valve with its lower region as an upward narrower side, bubbles are caused to concentrate in this section. These bubbles are therefore discharged with the ink.

In comparison with a case where the diaphragm valve is formed of a single thin diaphragm, the center position of the diaphragm valve is held by utilizing the rigidity of the elastic support member, irrespective of the oscillation of the carriage and the like, and the switching operation is stabilized by preventing the elastic coefficient of ink from fluctuating to ensure the reliable supply of ink to the recording head.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A valve unit discrete from an ink cartridge and capable of being located between the ink cartridge containing an ink and a recording head, the valve unit comprising:
   an ink supply needle; and
   a valve mechanism located downstream of the ink supply needle, wherein the valve mechanism opens at a pressure that is greater than a pressure exerted on the valve mechanism just by the ink in the ink cartridge.

2. The valve unit according to claim 1, wherein the ink supply needle is connectable to the ink cartridge.

3. A valve unit as in claim 1, further comprising a filter that is in fluid communication with the valve mechanism.

4. A valve unit as in claim 3, wherein the filter is located upstream of the valve mechanism.

5. A valve unit discrete from an ink cartridge and capable of being located between the ink cartridge and a recording head, the valve unit comprising:
   a hollow ink supply member; and
   a valve mechanism located downstream of the ink supply member, the valve mechanism including a diaphragm valve and a valve seat.

6. The valve unit according to claim 5, wherein the diaphragm valve includes a thin elastic diaphragm, a valve body formed on a surface of the thin elastic diaphragm and having an opening therein, and an elastic support portion formed on the thin elastic diaphragm and integral with the valve body.

7. A valve unit as in claim 5, further comprising a filter that is in fluid communication with the valve mechanism.

8. A valve unit as in claim 7, wherein the filter is located upstream of the valve mechanism.

9. A valve unit discrete from an ink cartridge and capable of being located between the ink cartridge containing an ink and a recording head, the valve unit comprising:

an ink supply needle; and a valve mechanism located downstream of the ink supply needle, the valve mechanism having a downstream side to be communicated with the recording head, and an upstream side to be communicated via the ink supply needle with the ink cartridge, wherein the valve mechanism opens in response to a pressure change between the downstream side and the upstream side caused by ink consumption by the recording head.

10. The valve unit according to claim 9, wherein the ink supply needle is connectable to the ink cartridge.

11. A valve unit as in claim 9, further comprising a filter that is in fluid communication with the valve mechanism.

12. A valve unit as in claim 11, wherein the filter is located upstream of the valve mechanism.

* * * * *